United States Patent
Mani et al.

(10) Patent No.: US 9,594,662 B2
(45) Date of Patent: Mar. 14, 2017

(54) AUTOMATED INSTRUMENTATION OF APPLICATIONS

(71) Applicant: CA, INC., Islandia, NY (US)

(72) Inventors: Ramesh Mani, Fremont, CA (US); Chitresh Deshpande, Mountain View, CA (US)

(73) Assignee: CA, INC., New York, NY (US)

( * ) Notice: Subject to any disclaimer, the term of this patent is extended or adjusted under 35 U.S.C. 154(b) by 169 days.

(21) Appl. No.: 14/469,608

(22) Filed: Aug. 27, 2014

(65) Prior Publication Data

US 2016/0062868 A1    Mar. 3, 2016

(51) Int. Cl.
*G06F 9/44*      (2006.01)
*G06F 11/34*     (2006.01)

(52) U.S. Cl.
CPC ...... *G06F 11/3466* (2013.01); *G06F 11/3409* (2013.01); *G06F 2201/81* (2013.01); *G06F 2201/865* (2013.01)

(58) Field of Classification Search
CPC .................................................. G06F 11/3466
USPC .................................................. 717/124–161
See application file for complete search history.

(56) References Cited

U.S. PATENT DOCUMENTS

| | | | | |
|---|---|---|---|---|
| 5,790,858 A * | 8/1998 | Vogel | ................. | G06F 11/3612 714/35 |
| 5,805,863 A * | 9/1998 | Chang | ................. | G06F 11/3466 714/E11.2 |
| 6,170,083 B1 * | 1/2001 | Adl-Tabatabai | ........ | G06F 8/443 714/E11.192 |
| 6,526,571 B1 * | 2/2003 | Aizikowitz | ........... | G06F 9/4431 712/E9.085 |
| 6,823,507 B1 * | 11/2004 | Srinivasan | .......... | G06F 11/3604 714/E11.218 |
| 2003/0097653 A1 * | 5/2003 | Kim | ........................ | G06F 8/452 717/160 |
| 2005/0149915 A1 * | 7/2005 | Wu | ...................... | G06F 9/45516 717/137 |

(Continued)

OTHER PUBLICATIONS

Profiling (computer programming)—Wikipedia, 2009, p. 1.*

(Continued)

*Primary Examiner* — Satish Rampuria
(74) *Attorney, Agent, or Firm* — Vierra Magen Marcus LLP (57) ABSTRACT

Methods for automatically identifying and instrumenting application classes and methods for a particular application are described. In some embodiments, application code (e.g., bytecode or source code) associated with the particular application may be parsed to identify classes and methods within the application code and to identify terminal components (e.g., methods or function calls) and non-terminal components (e.g., control flow statements). Once the terminal components and non-terminal components have been identified, a complexity model and a corresponding score for each of the classes and methods within the application code may be determined. The complexity model may be used to estimate the number of computations that may be required if a particular class or method is used by the particular application. Application classes and methods corresponding with a score that is greater than a threshold may be instrumented by inserting probes into the identified classes and methods.

20 Claims, 8 Drawing Sheets

(56) References Cited

U.S. PATENT DOCUMENTS

| | | | | |
|---|---|---|---|---|
| 2005/0182750 | A1* | 8/2005 | Krishna | G06F 11/3466 |
| 2005/0251791 | A1* | 11/2005 | Hundt | G06F 11/3466 |
| | | | | 717/130 |
| 2007/0266045 | A1* | 11/2007 | Bansal | H04L 67/125 |
| 2008/0148039 | A1* | 6/2008 | Cobb | G06F 11/3624 |
| | | | | 713/100 |
| 2008/0184209 | A1* | 7/2008 | LaFrance-Linden | G06F 8/443 |
| | | | | 717/130 |
| 2011/0283264 | A1* | 11/2011 | Gagliardi | G06F 11/3612 |
| | | | | 717/130 |
| 2012/0054725 | A1* | 3/2012 | Inglis | G06F 9/45516 |
| | | | | 717/148 |
| 2013/0246773 | A1 | 9/2013 | Mitran | |
| 2014/0040857 | A1 | 2/2014 | Trinchini | |
| 2014/0082596 | A1* | 3/2014 | Judelman | G06F 9/443 |
| | | | | 717/130 |

OTHER PUBLICATIONS

Bussell, B., and R. A. Koster. "Instrumenting computer systems and their programs." Proceedings of the Nov. 17-19, 1970, fall joint computer conference. ACM, 1970. pp. 525-534.*

Bach, Moshe, et al. "Analyzing parallel programs with pin." Computer 43.3 (2010): pp. 34-41.*

Lee, Han Bok, and Benjamin G. Zorn. "BIT: A Tool for Instrumenting Java Bytecodes." USENIX Symposium on Internet technologies and Systems. 1997. pp. 1-11.*

* cited by examiner

```
302
                        ┌─342
    public class Car { public int location;
      public int speed;

public Car(int initial_location, int initial_speed) {
        location = initial_location;
        speed = initial_speed;
      }
                        ┌─306
      public void slowdown(int decrement) {
        speed = speed – decrement;
      }
                        ┌─308
      public void speedup(int increment) {
        speed = speed + increment;
      }

```
public void somemethod() {

Car firstCar = new Car(4, 25);
  Car secondCar = new Car(5, 100);

for (int i=0; i<10; i++) {     ← 324, 326
    firstCar.speedup(2);          ← 328
    secondCar.slowdown(5);
  }

Airplane firstAirplane = new Airplane(2000)
  firstAirplane.slowdown(500);    ← 332 if (firstAirplane.speed == 1500) {   ← 334
    firstAirplane.speedup(100);        ← 336
  }

Score(somemethod) = For_loop_factor * [Score(firstCar.speedup) + Score(secondCar.slowdown)]

+ Score(firstAirplane.slowdown)   ∿ 358

+ If_Factor * Score(firstAirplane.speedup)   ∿ 362

AUTOMATED INSTRUMENTATION OF APPLICATIONS

BACKGROUND

The present disclosure relates to the automated instrumentation of application classes and methods.

Application performance management tools may be used to monitor and manage the performance and availability of software applications. For example, an application performance management tool may monitor the volume of transactions processed by a particular application over time (e.g., the number of transactions per second), the response times of the particular application over various load conditions (e.g., average response times under a peak load), and the computing and storage resources consumed by the particular application over time (e.g., the memory footprint). An application performance management tool may be used to identify objects (or instantiations of classes) and methods within a particular application responsible for run-time issues and/or performance issues by instrumenting application code (e.g., bytecode or source code) associated with the particular application. The application code may be instrumented by inserting probes into particular classes or methods within the application code prior to the application code being compiled into executable machine code. The probes may then be invoked during execution of the particular application in order to collect profiling information. In some cases, the instrumented code may be used to collect profiling information, such as method or function call counts, caller information (e.g., an identification of the calling function), callee information (e.g., an identification of the function called), time stamps associated with the entering and exiting of a particular method or function, and the time duration for each function call.

BRIEF SUMMARY

According to one aspect of the present disclosure, technology for automating the identification and instrumentation of application classes and methods is disclosed.

Technology is described for automatically identifying and instrumenting application classes and methods for a particular application. The methods within the particular application may comprise functions or procedures used by the particular application. A class may be used for creating a corresponding object or instantiation of the class for the particular application. A class may include one or more methods associated with the class. In some embodiments, application code (e.g., bytecode or source code) associated with the particular application may be parsed to identify classes and methods within the application code and to identify terminal components (e.g., methods or function calls) and non-terminal components (e.g., control flow statements). A control flow statement may include a looping statement (e.g., a "for" statement or "do-while" statement), a decision making statement (e.g., an "if-then" statement or a "switch" statement), or a branching statement (e.g., a "break" statement or "return" statement). Once the terminal components and non-terminal components have been identified, a complexity model and a corresponding score for each of the classes and methods within the application code may be determined. The complexity model may be used to estimate the number of computations that may be required if a particular class or method is used by the particular application. In some cases, application classes and methods corresponding with a score that is greater than a threshold may be instrumented by inserting probes into those classes or methods.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for automatically identifying and instrumenting application classes and methods for a particular application. The methods within the particular application may comprise functions or procedures used by the particular application. A class may provide a blueprint or structure for creating a corresponding object or instantiation of the class for the particular application. A class may include one or more methods associated with the class. In some embodiments, application code (e.g., bytecode or source code) associated with the particular application may be parsed to identify classes and methods within the application code and to identify terminal components (e.g., function calls) and non-terminal components (e.g., control flow statements). In one example, a terminal component may comprise a function call and a non-terminal component may comprise a control flow statement. A control flow statement may include a looping statement (e.g., a "for" statement or "do-while" statement), a decision making statement (e.g., an "if-then" statement or a "switch" statement), or a branching statement (e.g., a "break" statement or "return" statement). Once the terminal components and non-terminal components have been identified, a complexity model and a corresponding score for each of the classes and methods within the application code may be determined. The complexity model may be used to estimate the number of computations that may be required if a particular class or method is used by the particular application. In some cases, application classes and methods corresponding with a score that is greater than a threshold may be instrumented by inserting probes into the identified classes and/or methods.

In some embodiments, a first set of classes and a second set of methods located within application code used by a particular application may be automatically instrumented without manual selection or intervention by an end user of an application performance management tool monitoring the particular application. The first set of classes and the second set of methods may be identified and instrumented during loading of the application code into a virtual machine or prior to conversion of the application code into executable machine code. The first set of classes may be identified by determining that each class within the first set of classes has a complexity score that is greater than a first threshold. A complexity score may be determined for a particular class based on the number of methods called by methods of the particular class, the location of code associated with the called methods (e.g., whether the code for a method call is contained within the particular class, outside the particular class but within a particular package including the particular class, or outside of the particular package), and the types of control flow statements surrounding the called methods. A set of one or more classes may correspond with a package. A package may comprise a grouping of one or more classes. The grouping of classes may be used to organize related classes. A library may comprise one or more packages. The second set of methods may be identified by determining that each method within the second set of methods has a complexity score that is greater than a second threshold. The second threshold may be different from the first threshold. A complexity score may be determined for a particular method based on the number of methods called by the particular method, the location of code associated with the called methods (e.g., whether the code for a method call is contained within a particular class in which the particular method is defined, outside the particular class but within a particular package including the particular class, or outside of the particular package), and the types of control flow statements surrounding the called methods.

One benefit of automatically identifying application classes and methods used by a particular application for instrumentation without requiring manual selection or direction is that the debug or program development time for the particular application may be reduced. Furthermore, particular classes and methods associated with a new application that has not been previously analyzed may be immediately analyzed without inspecting new code associated with the new application. This may be particularly beneficial when the new code associated with the new application has been obfuscated (i.e., code that has been deliberately written or modified such that it is difficult for humans to understand).

Figure 1:
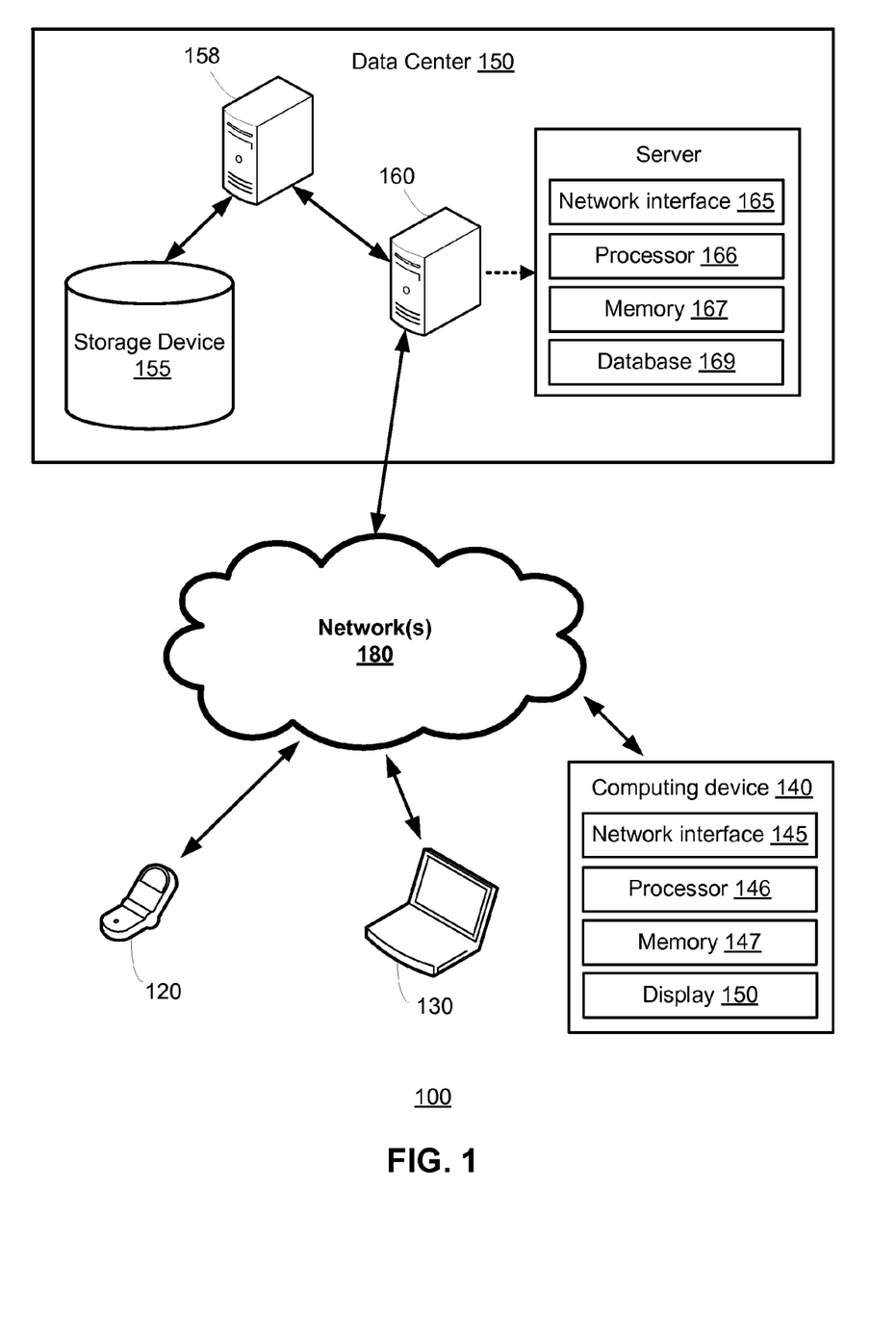
FIG. 1 depicts one embodiment of a networked computing environment.

FIG. 1 depicts one embodiment of a networked computing environment 100 in which the disclosed technology may be practiced. Networked computing environment 100 includes a plurality of computing devices interconnected through one or more networks 180. The one or more networks 180 allow computing devices and/or storage devices to connect to and communicate with other computing devices and/or other storage devices. As depicted, a mobile device 120, a mobile device 130, a computing device 140, and a data center 150 are in communication with each other via one or more networks 180. The data center 150 includes a server 160 (e.g., an edge server) in communication with a server 158 (e.g., an application server) that is in communication with a storage device 155 (e.g., a network-attached storage device). In some cases, the storage device 155 may comprise a hard disk drive, a magnetic tape drive, or a solid-state drive. In some embodiments, the networked computing environment may include other computing and/or storage devices not shown. For example, a data center may include thousands of servers and/or data storage devices in communication with each other. The data storage devices may comprise a tiered data storage infrastructure (or a portion of a tiered data storage infrastructure). In some cases, a tiered data storage infrastructure may include redundant arrays of independent disks and/or storage area networks.

The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection. The one or more networks 180 may include an extranet or other private network for securely sharing information or providing controlled access to applications.

A server, such as server 160, may allow a client to download information (e.g., executable, text, audio, image, and video files) from the server or to perform a search query related to particular information stored on the server. In some cases, server 160 may act as an application server or a file server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. In some cases, the server 160 may establish a secure connection with one or more computing devices (e.g., using a virtual private network connection). Processor 166 may comprise one or more processing elements (e.g., one or more CPUs). In one embodiment, server 160 may store data in a database 169 or acquire data to be processed from the database 169. The stored data associated with database 169 may reside in memory 167.

The networked computing environment 100 may provide a cloud computing environment for one or more computing devices. Cloud computing may refer to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents. The networked computing environment may comprise a cloud computing environment providing Software-as-a-Service (SaaS) or Infrastructure-as-a-Service (Iaas) services. Saas may refer to a software distribution model in which applications are hosted by a service provider and made available to end users over the Internet. The networked computing environment 100 may provide a software service that requires the availability of one or more applications to be operational.

The computing device 140 may comprise a mobile computing device, a non-mobile computing device, a server, a workstation, a laptop computer, a tablet computer, a desktop computer, or an information processing system. One embodiment of computing device 140 includes a network interface 145, processor 146, memory 147, and display 150, all in communication with each other. Network interface 145 allows computing device 140 to connect to one or more networks 180. Network interface 145 may include a wireless network interface, a modem, and/or a wired network interface. Processor 146 allows computing device 140 to execute computer readable instructions stored in memory 147 in order to perform processes discussed herein. Display 150 may display digital images and/or videos. Display 150 may comprise a touchscreen display. In some embodiments, various components of computing device 140 including the network interface 145, processor 146, and memory 147 may be integrated on a single chip substrate. In one example, the network interface 145, processor 146, and memory 147 may be integrated as a system on a chip (SOC). In other embodiments, the network interface 145, processor 146, and memory 147 may be integrated within a single package.

In some embodiments, application classes and methods for a particular application running on a computing device, such as computing device 140 or server 160, may be automatically identified and instrumented without requiring manual selection. The application classes and methods may be identified by parsing application code associated with the particular application and determining complexity scores for the application classes and methods. The application classes and methods with scores above a threshold may be instrumented by inserting probes into the application classes and methods. A complexity score may be used to estimate the computational complexity of a particular class or method. The complexity score may be determined based on the number of methods called, the location of code associated with the called methods (e.g., whether the code for a method call is contained within a particular class in which a particular method is defined, outside the particular class but within a particular package including the particular class, or outside of the particular package), and the types of control flow statements surrounding the called methods. Method calls associated with code located outside of the particular package may receive a higher score than method calls associated with code located within the particular package. Method calls associated with code located outside of the particular class may receive a higher score than method calls associated with code located within the particular class. In one example, the scores assigned to application classes and methods may be ranked and a number of the top scores (e.g., the top 10000 scores) may be automatically instrumented.

Figure 2:
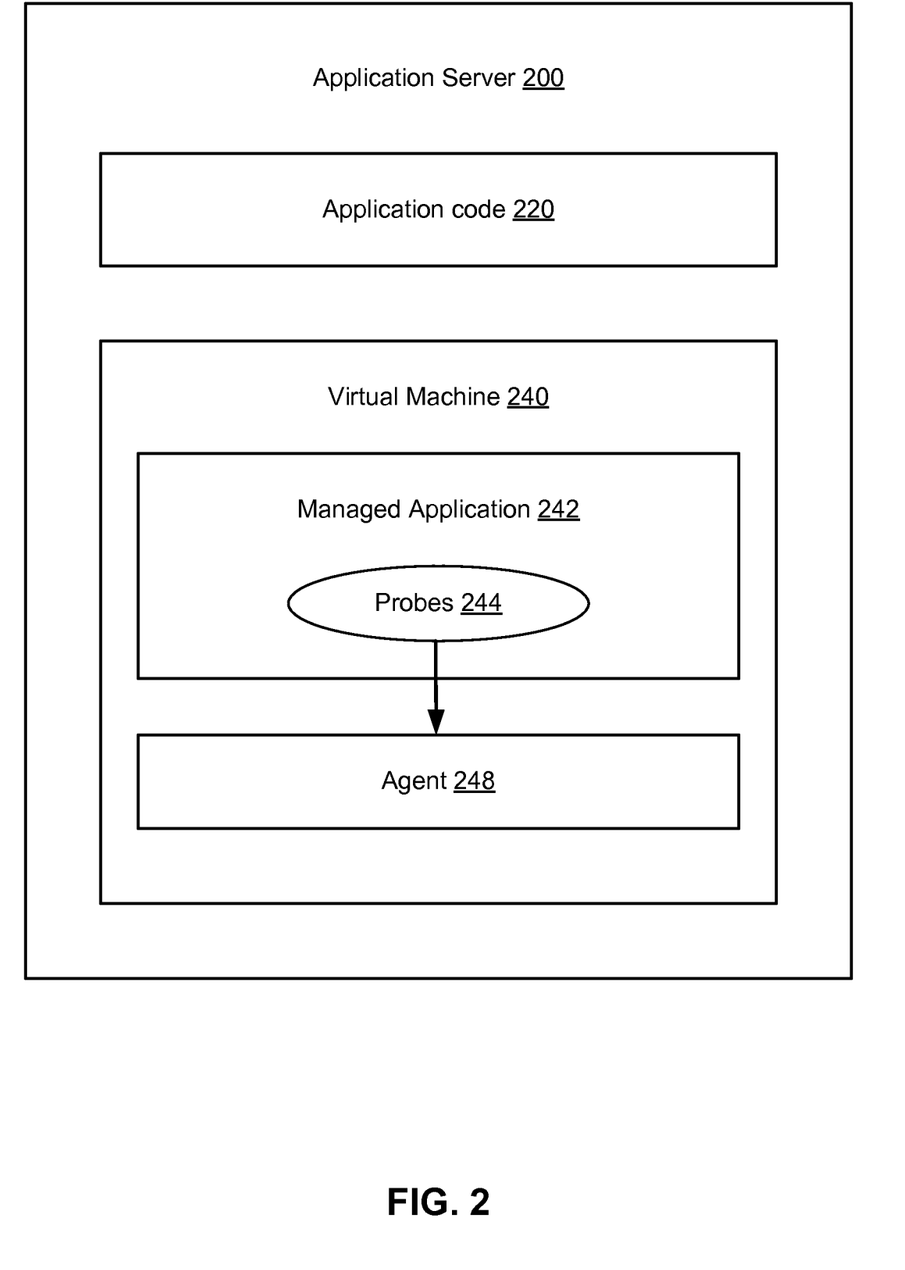
FIG. 2 depicts one embodiment of an application server.

FIG. 2 depicts one embodiment of an application server 200. In one embodiment, the application server 200 may comprise a server, such as server 160 in FIG. 1. The application server 200 includes application code 220 stored on the application server 200 and a virtual machine 240 running on the application server 200. In one example, the application code 220 comprises source code associated with a particular application. The source code may be stored as one or more files containing program code. The source code may be written using a programming language such as C, C#, C++, Java, Lisp, or Smalltalk. In another example, the application code 220 comprises bytecode associated with a particular application. The bytecode may comprise an intermediary format that may be executed on a particular virtual machine. For example, the bytecode may comprise bytecode for execution on a Java virtual machine or a Common Language Runtime (CLR) virtual machine. The virtual machine 240 may execute a managed application 242 and an agent 248 (e.g., a profiling agent). The managed application 242 may correspond with a particular application associated with application code 220 in which probes 244 have been inserted in order to obtain profiling information for the particular application. The probes 244 may be in communication with agent 248, which may acquire profiling information from application classes and methods that have been instrumented within the particular application.

In one embodiment, the virtual machine 240 may comprise a Java virtual machine for executing Java bytecode. The Java bytecode may comprise a machine independent code generated by a Java compiler. The Java bytecode may be executed by the virtual machine 240 or may be further compiled into executable machine code for execution on one or more processors within the application server 200. A Just-In-Time compiler (JIT) may be used to compile bytecodes to machine code during run-time. In some cases, bytecode instrumentation may be used to modify or add bytecode prior to execution. In one example, instrumentation may be added to bytecode during class loading or loading of bytecodes into the virtual machine 240. The bytecode instrumentation may add lines of bytecode before and after a specific method call within a class. In one embodiment, an instrumentation agent may be used to transform classes as they are being loaded into the virtual machine 240.

Figure 3A:
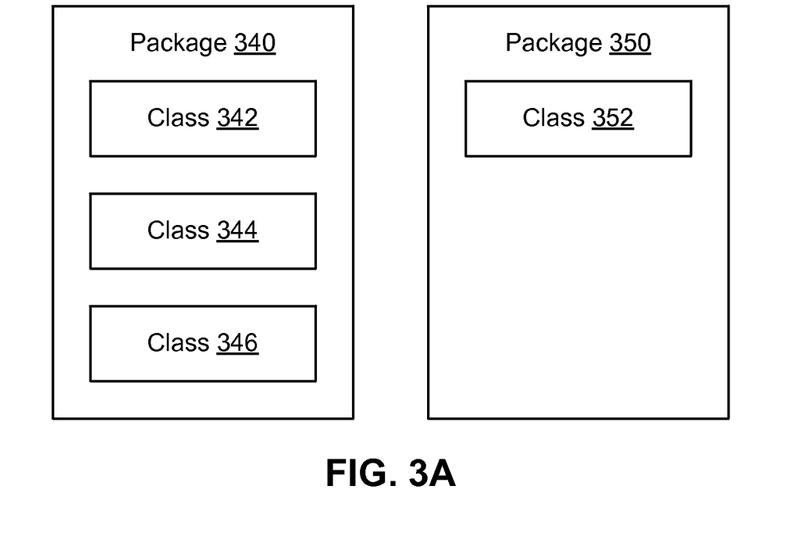
FIG. 3A depicts one embodiment of application code for a particular application.

FIG. 3A depicts one embodiment of application code for a particular application, such as application code 220 in FIG. 2. The application code comprises package 340 and package 350. Package 340 includes classes 342, 344, and 346. Package 350 includes class 352.

Figure 3B:
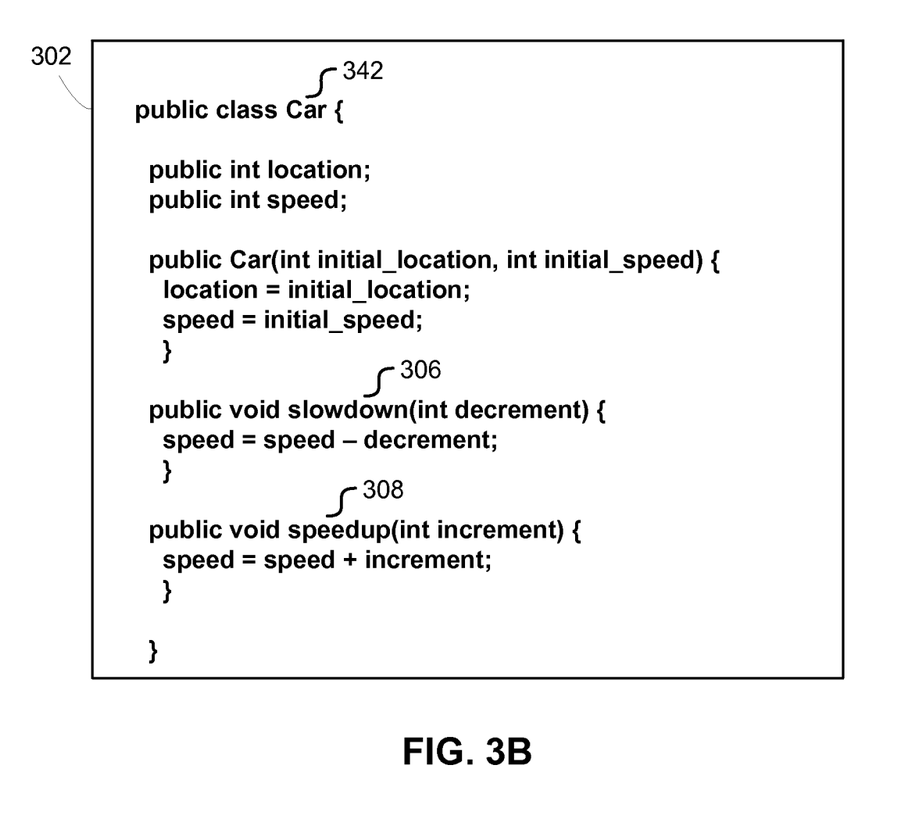
FIG. 3B depicts one embodiment of a class.

FIG. 3B depicts one embodiment of class 342 in FIG. 3A. As depicted, a file 302 may include a definition for the class 342. The class 342 includes a definition for a first method 306 (corresponding with a slowdown method) and a definition for a second method 308 (corresponding with a speedup method).

Figure 3C:
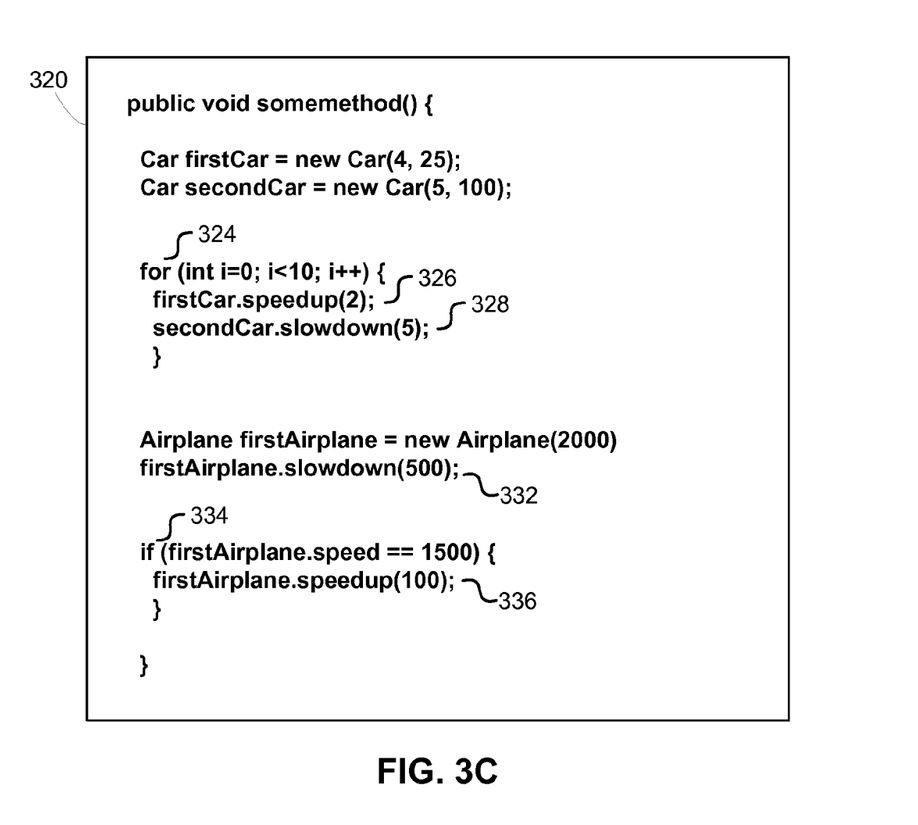
FIG. 3C depicts one embodiment of a method.

FIG. 3C depicts one embodiment of a method (referred to as somemethod) that uses objects created from the class 342 depicted in FIG. 3B. As depicted, a file 320 may include a definition for the method. The method includes a first non-terminal component associated with a "for" loop 324 and a second non-terminal component associated with an "if" statement 334. Within the "for" loop 324 are two terminal components. The terminal components include a first call 326 to a first method associated with a first object (firstCar.speedup) and a second call 328 to a second method associated with a second object (secondCar.slowdown). The method includes a third terminal component comprising a third call 332 to a third method associated with a third object (firstAirplane.slowdown). The "if" statement 334 controls the execution of a fourth terminal component comprising a fourth call 336 to a fourth method associated with the third object (firstAirplane.speedup). In one embodiment, the first object (firstCar) and the third object (firstAirplane) may be defined within a common package. In this case, the method calls associated with the first object and the third object may be given similar weights or scores. In another embodiment, the first object (firstCar) may be defined in a first package that includes the class definition for the first object and the third object may be defined in a second package. In this case, the method calls associated with the first object and the third object may be given different weights or scores. In one example, the weight or score given to method calls associated with the third object may be greater than the scores given to method calls associated with the first object.

Figure 3D:
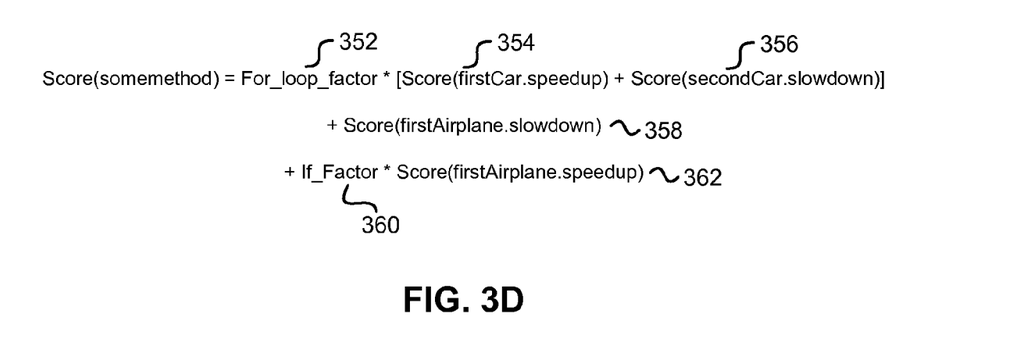
FIG. 3D depicts one embodiment of a complexity model for scoring a method.

FIG. 3D depicts one embodiment of a complexity model for scoring a method. As depicted, the complexity model for the method defined by the code depicted in FIG. 3C may comprise an equation. The equation includes a first factor 352 (For_loop_factor), a second factor 360 (If_factor), and method scores 354, 356, 358, and 362 corresponding with scores for the four method calls within the "somemethod" method. In some cases, the non-terminal components identified within the method definition may correspond with factors (or multiplication factors), while terminal components identified within the method definition may correspond with methods called by the "somemethod" method that have been individually scored. A score for the "somemethod" method may be computed by combining the product of the first factor and the sum of the method scores 354 and 356 with the method score 358 and the product of the second factor and the method score 362. In some cases, the first factor may be greater than the second factor. The value assigned to a factor may depend on the type of control flow statement associated with the factor. In the case that the first factor is assigned a value of 10, the second factor is assigned a value of 2, and each of the values for the method scores 354, 356, 358, and 362 are determined to be 5, then the score derived from the complexity model would be 115.

Figure 4A:
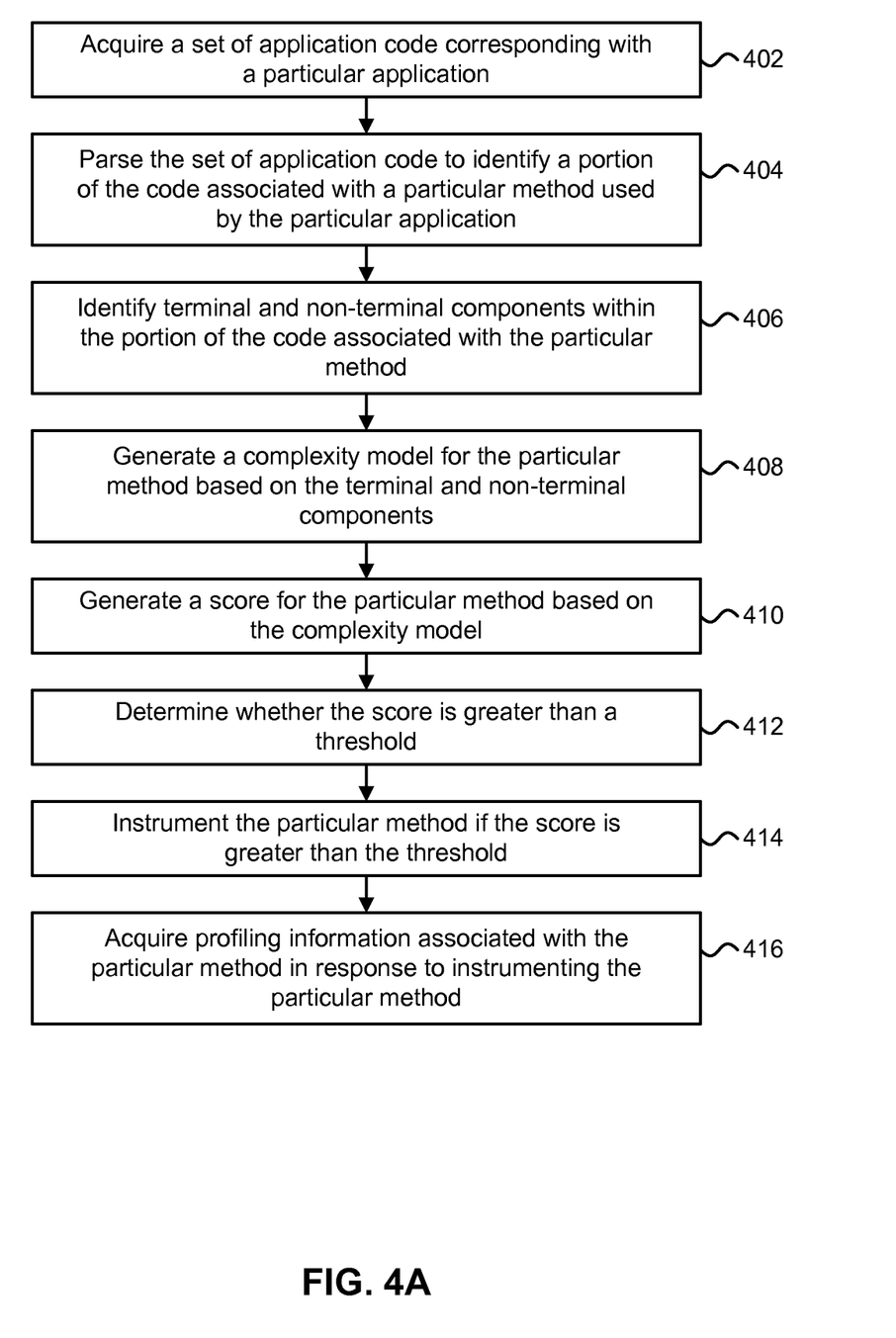
FIG. 4A is a flowchart describing one embodiment of a process for automatically instrumenting a particular application.

FIG. 4A is a flowchart describing one embodiment of a process for automatically instrumenting a particular application. In one embodiment, the process of FIG. 4A is performed by a server, such as server 160 in FIG. 1.

In step 402, a set of application code corresponding with a particular application is acquired. The set of application code may comprise source code or bytecode. The set of application code may comprise one or more files containing program code. The particular application may comprise a software application, such as a database application. In one embodiment, the set of application code may be acquired during loading of the set of application code into a virtual machine, such as virtual machine 240 in FIG. 2. In one example, a class loader for locating and loading classes into a Java virtual machine may acquire the set of application code prior to loading the set of application code into the Java virtual machine. In another embodiment, the set of application code may be acquired prior to being compiled into executable machine code (i.e., before a binary is generated for the set of application code).

In step 404, the set of application code is parsed to identify a portion of the code associated with a particular method used by the particular application. In one example, the portion of the code associated with the particular method may correspond with application code defining the particular method, such as the Java code for defining the "somemethod" method in FIG. 3C. In one embodiment, the portion of the code associated with a particular method may be identified using a parser that identifies tokens within the set of application code and builds a data structure or returns information from the set of application code based on the identified tokens. The parser may utilize a scanner or lexical analyzer (e.g., Lex) for identifying the tokens within a file including the set of application code in combination with a parser generator (e.g., Yacc or Bison). A token may comprise a string of one or more characters. The parser generator may use a formal grammar to parse the file (or input data stream) in order to identify terminal components and non-terminal components within the set of application code.

In step 406, terminal and non-terminal components within the portion of the code associated with the particular method are identified. The terminal components and the non-terminal components may be identified using a parser generator. The terminal components may comprise methods or function calls made by the particular method. The non-terminal components may comprise control flow statements made within the particular method. A control flow statement may correspond with a "for" loop, an "if-then" statement, or a "switch" statement.

In step 408, a complexity model for the particular method is generated based on the terminal and non-terminal components identified in step 406. The complexity model may comprise an equation for estimating the computational complexity of the particular method. The non-terminal components may correspond with multiplication factors within the equation and the terminal components may correspond with methods called by the particular method that may be individually scored. In some cases, method calls associated with code located outside of a particular package that includes the particular method may receive a higher score than method calls associated with code located within the particular package. In step 410, a score for the particular method is generated based on the complexity model.

In step 412, it is determined whether the score is greater than a threshold. The threshold may comprise an instrumentation threshold for determining whether the particular method should be automatically instrumented. In some cases, the score may be outputted or displayed (e.g., on a computer monitor) if the score is determined to be greater than the threshold. In step 414, the particular method is instrumented if the score is greater than the threshold. The particular method may be instrumented by inserting one or more probes into the portion of the code associated with the particular method. In one example, the probes may be invoked whenever the particular method is called during execution of the particular application. In some cases, the particular method may be automatically instrumented if the score for the particular method is ranked within a top number of complexity scores (e.g., within the top 500 scores for the particular application). In step 416, profiling information associated with the particular method is acquired in response to instrumenting the particular method. The profiling information may include the number of times that the particular method has been called, identifications of the methods that called the particular method, and the time duration for each method call for the particular method.

Figure 4B:
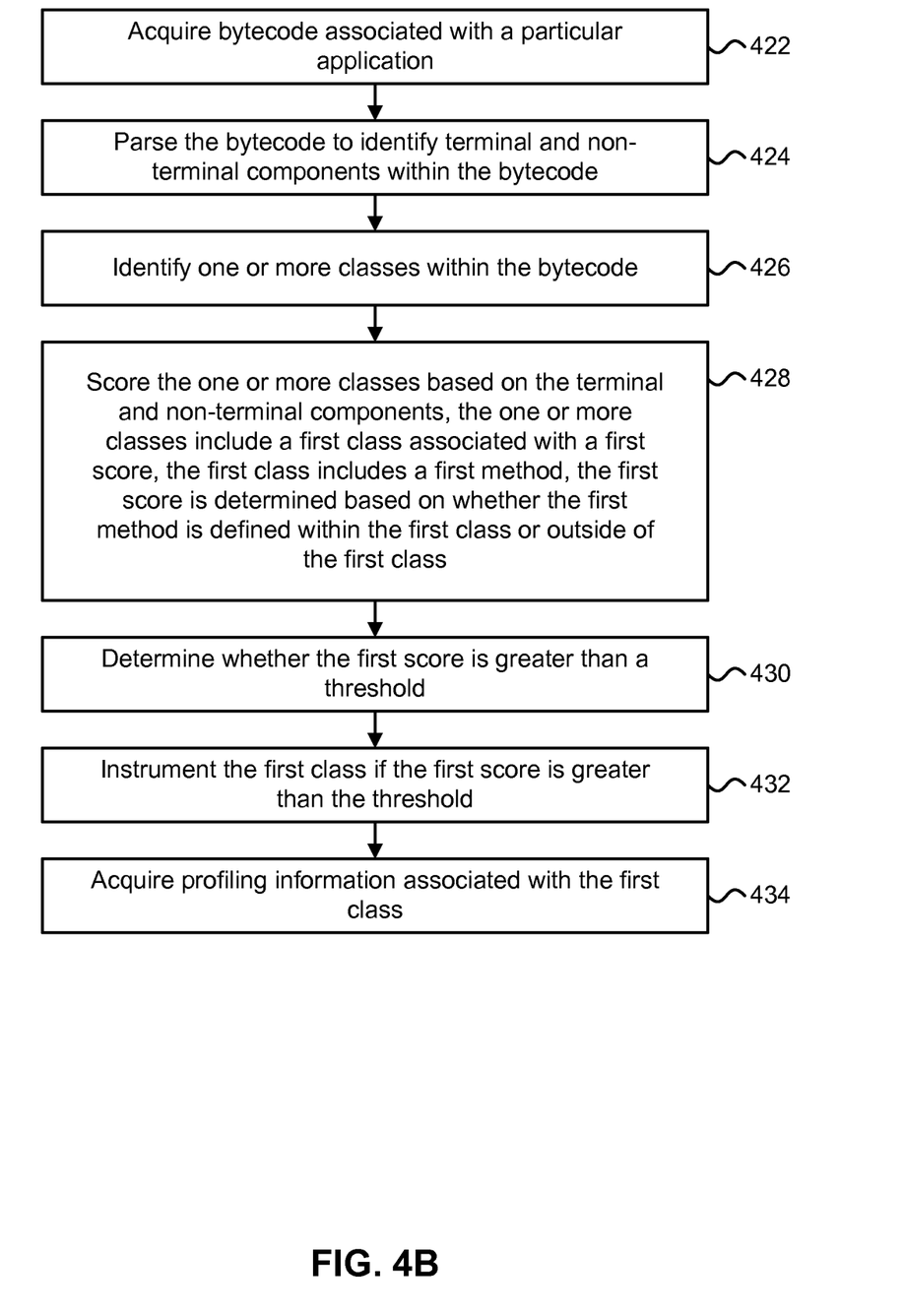
FIG. 4B is a flowchart describing another embodiment of a process for automatically instrumenting a particular application.

FIG. 4B is a flowchart describing an alternative embodiment of a process for automatically instrumenting a particular application. In one embodiment, the process of FIG. 4B is performed by a server, such as server 160 in FIG. 1.

In step 422, bytecode associated with a particular application is acquired. The bytecode may comprise Java bytecode. The bytecode may be stored in one or more files. The particular application may comprise a software application, such as an image processing application. In one embodiment, the bytecode may be acquired during loading of the bytecode into a virtual machine, such as virtual machine 240 in FIG. 2. In step 424, the bytecode is parsed to identify terminal and non-terminal components within the bytecode. The terminal components and the non-terminal components may be identified using a parser generator or a phrase analyzer. The terminal components may comprise methods or function calls made within a particular class. The non-terminal components may comprise control flow statements made within the particular class. A control flow statement may correspond with a "for" loop, an "if-then" statement, or a "switch" statement.

In step 426, one or more classes are identified within the bytecode. In step 428, the one or more classes are scored based on the terminal and non-terminal components. The one or more classes may include a first class associated with a first score. The first class may include a first method. The first score may be determined based on whether the first method is defined within the first class or is defined outside of the first class. In some cases, the first score may be determined based on whether the first method is defined within a package that includes the first class or whether the first method is defined outside of the package.

In step 430, it is determined whether the first score is greater than a threshold. The threshold may comprise an instrumentation threshold for determining whether the first class should be automatically instrumented. In some cases, the first score may be outputted or displayed (e.g., on a computer monitor) if the first score is determined to be greater than the threshold. In step 432, the first class is instrumented if the first score is greater than the threshold. The first class may be instrumented by inserting one or more probes into bytecode associated with the first class. In step 434, profiling information associated with the first class is acquired. The profiling information may include the number of objects that have been created from the first class.

Figure 4C:
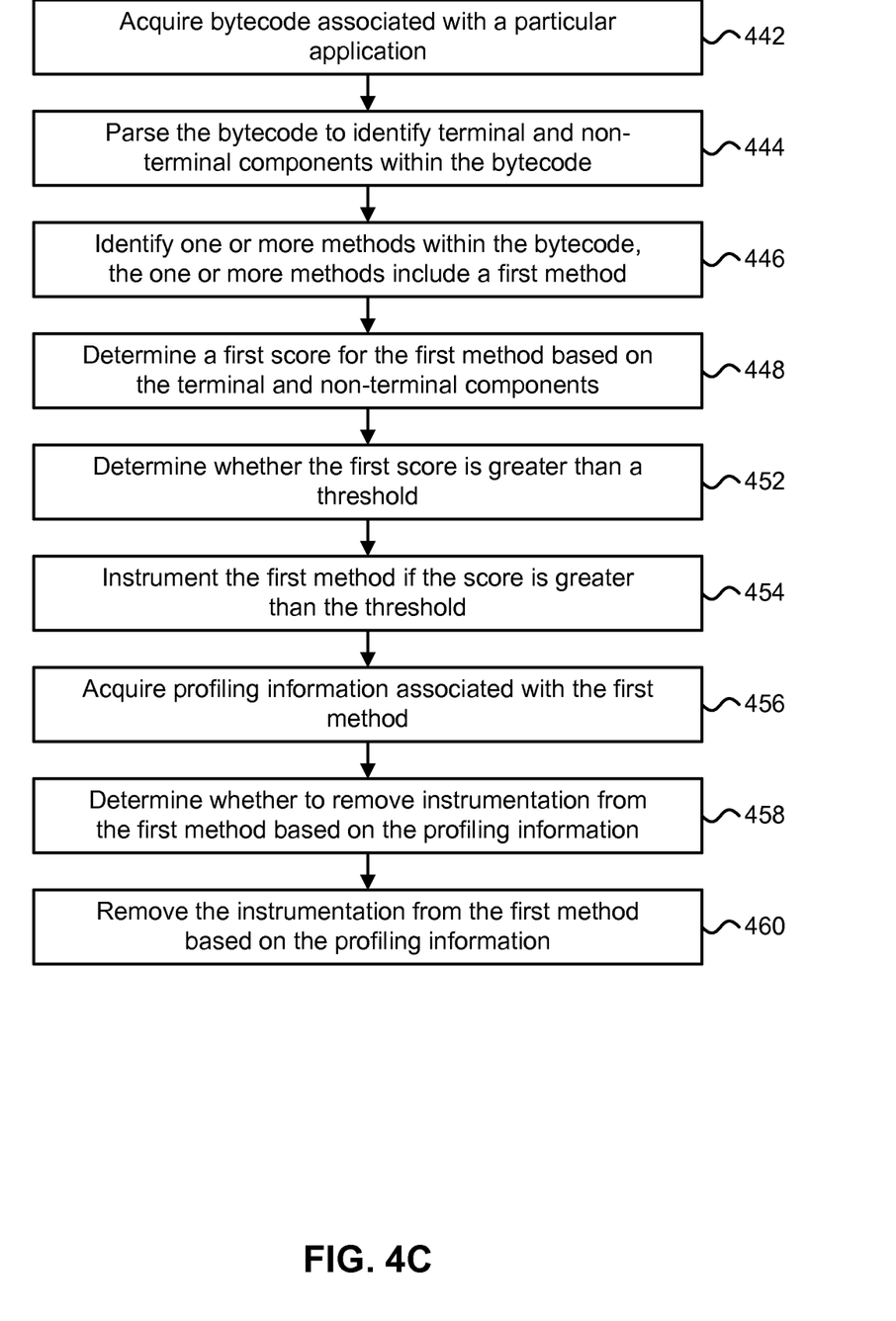
FIG. 4C is a flowchart describing an alternative embodiment of a process for automatically instrumenting a particular application.

FIG. 4C is a flowchart describing an alternative embodiment of a process for automatically instrumenting a particular application. In one embodiment, the process of FIG. 4C is performed by a server, such as server 160 in FIG. 1.

In step 442, bytecode associated with a particular application is acquired. The bytecode may comprise Java bytecode. The bytecode may be stored in one or more files. The particular application may comprise a software application, such as a gaming application. In one embodiment, the bytecode may be acquired during loading of the bytecode into a virtual machine, such as virtual machine 240 in FIG. 2. In step 444, the bytecode is parsed to identify terminal and non-terminal components within the bytecode. The terminal components and the non-terminal components may be identified using a parser generator or a phrase analyzer. The terminal components may comprise methods or function calls. The non-terminal components may comprise control flow statements. A control flow statement may correspond with a "for" loop, an "if-then" statement, or a "switch" statement.

In step 446, one or more methods are identified within the bytecode. The one or more methods may include a first method. In step 448, a first score is determined for the first method based on the terminal and non-terminal components. In step 452, it is determined whether the first score is greater than a threshold. The threshold may comprise an instrumentation threshold for determining whether the first method should be automatically instrumented. In step 454, the first method is instrumented if the score is greater than the threshold. The first method may be instrumented by inserting one or more probes into bytecode associated with the first method. In step 456, profiling information associated with the first method is acquired. The profiling information may include the number of times that the first method has been called, identifications of the methods that called the first method, and the time duration for each method call for the first method. In one embodiment, additional probes may be inserted into bytecode associated with methods that called the first method if the first method was called more than a particular number of times within a particular time period (e.g., a calling method may be automatically instrumented if the first method was called more than three times within a one second time period).

In step 458, it is determined whether to remove instrumentation from the first method based on the profiling information. In step 460, the instrumentation is removed from the first method based on the profiling information. In one embodiment, one or more probes that were previously inserted into the first method may be removed if the first method has been called less than a particular number of times within a particular time period (e.g., less than two times within a three second period).

One embodiment comprises acquiring application code corresponding with a particular application, identifying terminal and non-terminal components within a portion of the application code corresponding with a particular method used by the particular application, determining a score for the particular method based on the terminal and non-terminal components within the portion of the application code, and instrumenting the particular method based on the score.

One embodiment comprises a storage device and a processor in communication with the storage device. The storage device stores application code corresponding with a particular application. The processor acquires the application code corresponding with the particular application and identifies terminal and non-terminal components within a portion of the application code corresponding with a particular method used by the particular application. The processor determines a score for the particular method based on the terminal and non-terminal components within the portion of the application code. The processor instruments the particular method based on the score. The processor may comprise one or more processing elements.

One embodiment comprises a computer program product comprising a computer readable storage medium having computer readable program code embodied therewith. The computer readable program code configured to acquire application code corresponding with a particular application and to identify terminal and non-terminal components within a portion of the application code corresponding with a particular class used by the particular application. The terminal and non-terminal components comprise a first method call and a first control flow statement. The computer readable program code configured to determine a score for the particular class based on the terminal and non-terminal components within the portion of the application code and to instrument the particular class if the score is greater than an instrumentation threshold.

Figure 5:
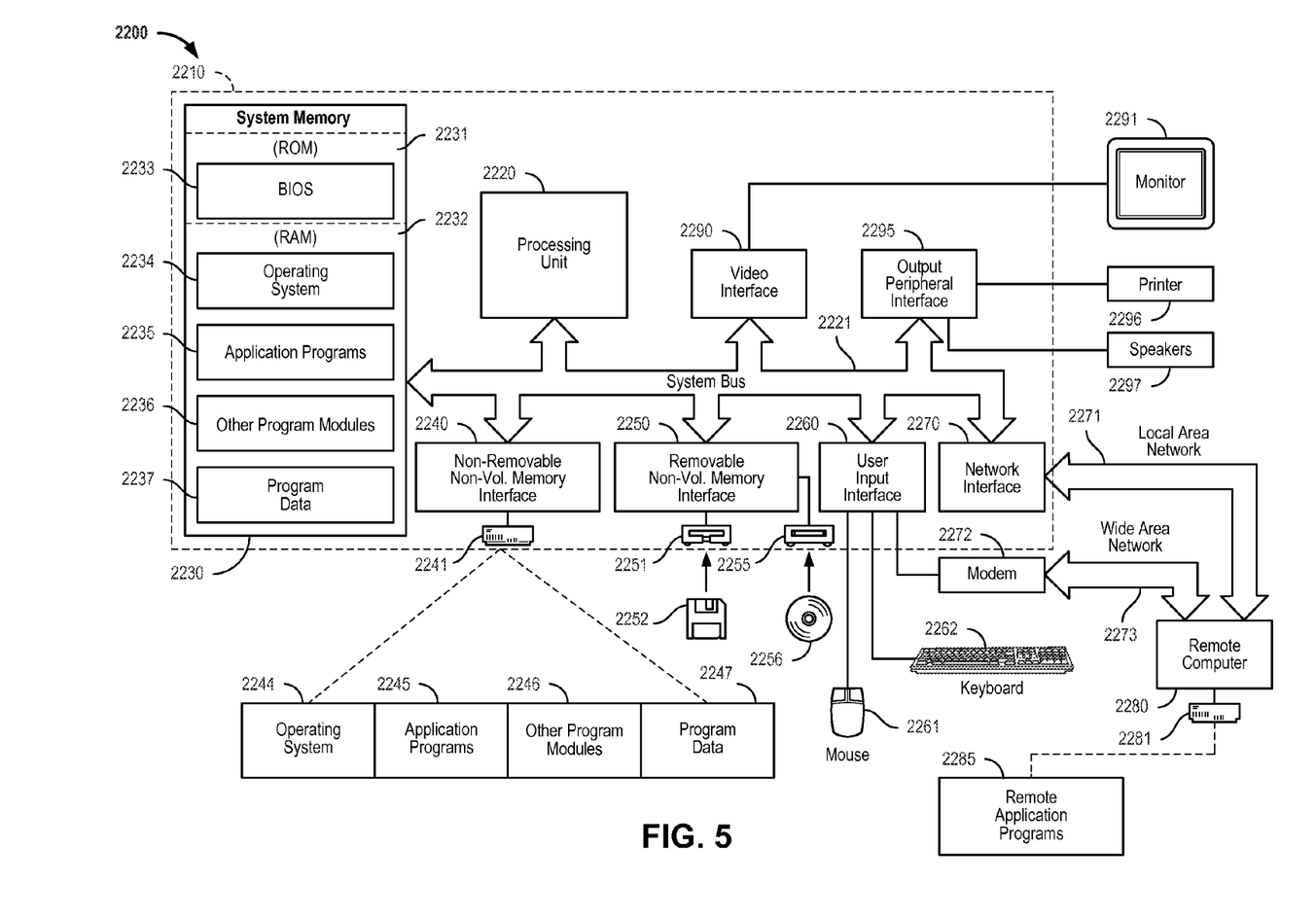
FIG. 5 is a block diagram of an embodiment of a computing system environment.

The disclosed technology may be used with various computing systems. FIG. 5 is a block diagram of an embodiment of a computing system environment 2200, such as server 160 in FIG. 1. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application programs 2235, other program modules 2236, and program data 2237.

The computer 2210 may also include other removable/non-removable, volatile/nonvolatile computer storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media described above provide storage of computer readable instructions, data structures, program modules and other data for the computer 2210. Hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210. The logical connections may include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application programs 2285 may reside on memory device 2281. It will be appreciated that the network connections shown are exemplary and other means of establishing a communications link between the computers may be used.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for automatically identifying and instrumenting a particular method used by a particular application, comprising:
   acquiring application code corresponding with the particular application;
   identifying terminal and non-terminal components within a portion of the application code corresponding with the particular method used by the particular application, the identifying the terminal components includes identifying a first method call and a second method call within the portion of the application code, the identifying the non-terminal components includes identifying a looping statement and a decision making statement within the portion of the application code;
   determining a score for the particular method based on the terminal and non-terminal components within the portion of the application code, the determining a score for the particular method comprises determining a first factor corresponding with the looping statement and a second factor corresponding with the decision making statement, the determining a score for the particular method comprises determining a first method score corresponding with the first method call and a second method score corresponding with the second method call, the determining a score for the particular method comprises determining the score for the particular method based on a first product of the first factor and the first method score and a second product of the second factor and the second method score, the second factor is different from the first factor; and
   instrumenting the particular method based on the score.

2. The method of claim 1, wherein:
   the instrumenting the particular method comprises instrumenting the particular method if the score is greater than a threshold; and
   the second factor is less than the first factor.

3. The method of claim 1, further comprising:
   generating a complexity model for the particular method based on the terminal and non-terminal components, the determining a score for the particular method comprises determining the score based on the complexity model.

4. The method of claim 1, wherein:
   the determining a score for the particular method comprises determining the score based on whether the first method call is defined within the particular method or outside of the particular method.

5. The method of claim 1, wherein:
   the determining a score for the particular method comprises determining the score based on whether the first method call is defined within a particular package that comprises the particular method or outside of the particular package.

6. The method of claim 1, further comprising:
   acquiring profiling information associated with the particular method in response to instrumenting the particular method, the instrumenting the particular method comprises inserting one or more probes into the portion of the application code.

7. The method of claim 6, further comprising:
   determining whether to remove the one or more probes from the portion of the application code based on the profiling information; and
   removing the one or more probes from the portion of the application code based on the profiling information.

8. The method of claim 1, wherein:
   the application code comprises bytecode;
   the terminal and non-terminal components comprise a first function call and a first control flow statement; and
   the identifying terminal and non-terminal components within a portion of the application code comprises parsing the portion of the application code to identify the first function call and the first control flow statement.

9. The method of claim 1, wherein:
   the determining a score for the particular method comprises determining the score based on a number of method calls within the particular method.

10. The method of claim 1, wherein:
    the application code comprises source code.

11. A system for automatically instrumenting a particular application, comprising:
    a storage device configured to store application code corresponding with the particular application; and
    a processor in communication with the storage device, the processor configured to acquire the application code corresponding with the particular application and identify terminal and non-terminal components within a portion of the application code corresponding with a particular method used by the particular application, the processor configured to determine a score for the particular method based on the terminal and non-terminal components within the portion of the application code, the processor configured to identify a first method call and a second method call within the portion of the application code, the processor configured to identify a looping statement and a decision making statement within the portion of the application code, the processor configured to determine a first factor corresponding with the looping statement and a second factor corresponding with the decision making statement, the processor configured to determine a first method score corresponding with the first method call and a second method score corresponding with the second method call, the processor configured to determine the score for the particular method based on a first product of the first factor and the first method score and a second product of the second factor and the second method score, the second factor is different from the first factor, the processor configured to instrument the particular method based on the score.

12. The system of claim 11, wherein:
the processor configured to instrument the particular method if the score is greater than a threshold; and
the second factor is less than the first factor.

13. The system of claim 11, wherein:
the processor configured to generate a complexity model for the particular method based on the terminal and non-terminal components, the processor determines the score based on the complexity model.

14. The system of claim 11, wherein:
the processor configured to determine the score based on whether the first method is defined within the particular method or outside of the particular method.

15. The system of claim 11, wherein:
the processor configured to determine the score based on whether the first method is defined within a particular package that comprises the particular method or outside of the particular package.

16. The system of claim 11, wherein:
the processor configured to acquire profiling information associated with the particular method in response to instrumenting the particular method and instrument the particular method by inserting one or more probes into the portion of the application code.

17. The system of claim 16, wherein:
the processor configured to remove the one or more probes from the portion of the application code based on the profiling information.

18. The system of claim 11, wherein:
the application code comprises bytecode;
the terminal and non-terminal components comprise a first function call and a first control flow statement; and
the processor configured to identify the terminal and non-terminal components within the portion of the application code by parsing the portion of the application code to identify the first function call and the first control flow statement.

19. The system of claim 11, wherein:
the application code comprises source code.

20. A computer program product, comprising:
a non-transitory computer readable storage medium having computer readable program code embodied therewith, the computer readable program code comprising:
computer readable program code configured to acquire application code corresponding with a particular application;
computer readable program code configured to identify a terminal component and a non-terminal component within a portion of the application code corresponding with a particular class used by the particular application, the computer readable program code configured to identify a first method call and a second method call within the portion of the application code, the computer readable program code configured to identify a looping statement and a decision making statement within the portion of the application code;
computer readable program code configured to determine a score for the particular class based on the terminal component and the non-terminal component within the portion of the application code, the computer readable program code configured to determine a first factor corresponding with the looping statement and a second factor corresponding with the decision making statement, the computer readable program code configured to determine a first method score corresponding with the first method call and a second method score corresponding with the second method call, the computer readable program code configured to determine the score for the particular method based on a first product of the first factor and the first method score and a second product of the second factor and the second method score, the second factor is different from the first factor; and
computer readable program code configured to instrument the particular class if the score is greater than an instrumentation threshold.

* * * * *